(12) United States Patent
Ferguson

(10) Patent No.: US 7,889,211 B2
(45) Date of Patent: Feb. 15, 2011

(54) MEASURING PSNR OF FULL COLOR VIDEO

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 1478 days.

(21) Appl. No.: 10/123,833

(22) Filed: Apr. 15, 2002

(65) Prior Publication Data
US 2003/0193511 A1 Oct. 16, 2003

(51) Int. Cl.
*G09G 5/00* (2006.01)

(52) U.S. Cl. ............... 345/643; 345/589; 345/604; 345/426; 345/690; 382/167; 348/909

(58) Field of Classification Search ............... 345/582, 345/604, 643, 589; 358/520, 519, 518; 348/655, 348/645, 909; 382/167
See application file for complete search history.

(56) References Cited

U.S. PATENT DOCUMENTS

| | | | | |
|---|---|---|---|---|
| 5,432,893 | A * | 7/1995 | Blasubramanian et al. .. | 345/600 |
| 5,940,124 | A * | 8/1999 | Janko et al. ................ | 348/189 |
| 6,104,839 | A * | 8/2000 | Cok et al. ................... | 382/254 |
| 6,181,374 | B1 * | 1/2001 | Saito et al. ............... | 348/223.1 |
| 6,362,808 | B1 * | 3/2002 | Edge et al. ................. | 345/601 |
| 6,577,764 | B2 * | 6/2003 | Myler et al. ............... | 382/228 |

FOREIGN PATENT DOCUMENTS

JP 2000102009 A 4/2000

OTHER PUBLICATIONS

NASA: Applied Information Technology Division, "Peak Signal to Noise Ratio/Mean Squared Error", http://appliedit.arc.nasa.gov/videotech/psnr.html, Last Update: Dec. 19, 2000.*

International Telecommunications Union, "Recommendation ITU-R BT.601-5: Studio Encoding Parameters of Digital Television for Standard 4:3 and Wide-Screen 16:9 Aspect Ratios", Last Revision: 1995.*

American National Standard for Telecommunications, "ANSI T1.801.03-1996: Digital Transport of One-Way Video Signals—Parameters for Objective Performance Assessment" Approved Feb. 5, 1996.*

(Continued)

*Primary Examiner*—Antonio A Caschera
(74) *Attorney, Agent, or Firm*—Francis I. Gray; Matthew D. Rabdau; Michael A. Nelson

(57) ABSTRACT

A method of measuring peak signal to noise ratio (PSNR) of full color video, both total and component contributions as well as providing PSNR full color and component maps includes converting the components of the full color video for both reference and impaired video signals to RGB values, and computing the error energy for each of the G, B and R channels between the reference and impaired video signals. Each component contribution to the error for the full color video components is assessed by setting the other components to a reference value, such as zero. Also the total full color PSNR is computed in RGB. Finally a color residual PSNR map is generated and displayed together with the computed PSNR results to enable a user to visualize where the significant impairments occur in the impaired video.

3 Claims, 4 Drawing Sheets

OTHER PUBLICATIONS

Barbur, J., Squire, T., Harlow, A.; "Minimum colour vision requirements for pilots—a study of functional aspects of chromatic signals in human vision;" Mar. 12, 2001; http://www.city.ac.uk/avrc/groups/cpo/example1.html.*

Foley, van Dam, Feiner, Hughes; "Computer Graphics: Principles and Practice, Second Edition in C", Addison-Wesley Publishing Company, Inc., 1996, pp. 575.*

Huang, H.-C., Huang J.-H., and Wu, J.L., "Real-Time Software-Based Video Coder for Multimedia Communication Systems," date unknown.*

Nakachi, Y. and Fujii, T., "Unified Lossless and Near-Lossless Color Image Coding Based on Adaptive Quantization", IEEE Intl Symposium on Circuits and Systems, May 28-31, 2000, pp. III-303-306.*

Wikipedia Encyclopedia Definition http://en.wikipedia.org/wiki/PSNR.*

Huang, H.-C., Huang, J.-H., Wu, J.-L., "Real-Time Software-Based Video Coder for Multimedia Communications Systems," Proceedings of the first ACM International Conference on Multimedia, Sep. 1993 pp. 1-10.*

Nakachi, T. and Fujii, T., "Unified Lossless and Near-Lossless Color Image Coding Based on Adaptive Quantization," IEEE ISCAS 2000, May 28-31, 2000, pp. III-303 to III-306.k.*

Nakachi et al. "Unified lossless and near-lossless color image coding based on adaptive quantization." Circuits and Systems, 2000. Proceedings. ISCAS 2000 Geneva. The 2000 IEEE International Symposium on. vol. 3, May 28-31, 2000 pp. 303-306 vol. 3. Digital Object Identifier 10.1109/ISCAS.2000.856057.*

"Definitions for full color on the Web:"—"full color" definition from http:///www.gaudette-net.com/slides/glossary.html (via Google search). Accessed Apr. 30, 2007.*

Wang et al. "Video Processing and Communications." Prentice Hall, 1st edition. Published Sep. 27, 2001. ISBN 0-13-017547-1. pp. 1-32.*

Nakachi, Takayuki et al., "Unified lossless and near-lossless color image coding based on adaptive quantization," ISCAS 2000—IEEE International Symposium on Circuits and Systems, May 28-31, 2000.

* cited by examiner

MEASURING PSNR OF FULL COLOR VIDEO

BACKGROUND OF THE INVENTION

The present invention relates to video quality of service, and more particularly to a method of measuring peak signal to noise ratio (PSNR) of full color video, both total and component contributions.

It is desired to quantify the error in color related components—chrominance, color difference, etc.—of video signals in an objective manner using units compatible with existing industry standards. PSNR is such a method for luminance only, as defined in ANSI® T1.801.03-1996: *Digital Transport of One-Way Video Signals—Parameters for Objective Performance Assessment*, page 35. An implementation of this standard is found in the PQA200 and PQA300 Picture Quality Analyzers manufactured by Tektronix, Inc., Beaverton, Oreg. PSNR is a measurement that gives one value for each frame or sequence of frames of the video signal under test, given the reference frame or sequence. It is also desirable to have an error map, similar to the luminance difference map, labeled "PSNR" map in the TEKTRONIX® PQA200/300 products, that displays luminance and chrominance errors simultaneously in an intuitive manner. And finally it is desirable to measure the contribution of constituent video components, i.e., $C_b$ of $YC_bC_r$, to the total PSNR measurement.

PSNR stands for Peak Signal to Noise Ratio and is proportional to the log of a ratio of root mean square (rms) values. From ANSI® T1.801.03-1996:

$$PSNR(V_{peak}, C_{in}, C_{out}, N_{col}, N_{row}, i, j, t, d) := 20*\log [V_{peak}/\{SQRT((1/(N_{col}*N_{row}))*\Sigma_j\Sigma_i(Cin_{i,j,t-d} - Cout_{i,j,t})^2)\}]$$

where $C_{in}$ and $C_{out}$ are general image parameters, $V_{peak}$ is the reference peak unit value for $C_{in}$ and $C_{out}$, $N_{col}$ is the number of columns (width) of parameter matrix C, $N_{row}$ is the number of rows (height) of parameter matrix C, i is the row index, j is the column index, t is the time index, and d is the delay between $C_{in}$ and $C_{out}$. The ratio taken is the peak rms value possible for the measure divided by the actual rms difference between the test ($C_{out}$) and reference ($C_{in}$) video signals. PSNR for the TEKTRONIX® PQA200/300 products and most measurements within the ANSI® document cited above, as well as other picture quality of service (PQOS) methods, use $C_{in}$ and $C_{out}$ taken directly or indirectly from the pixel luminance (Y) values alone. $V_{peak}$ is taken as peak white.

$$LumPSNR(Y_{peak}, Y_{in}, Y_{out}, N_{col}, N_{row}, i, j, t, d) := 20*\log [Y_{peak}/\{SQRT((1/(N_{col}*N_{row}))*\Sigma_j\Sigma_i(Yin_{i,j,t-d} - Yout_{i,j,t})^2)\}]$$

Thus chrominance errors that occur independent from luminance errors are undetected by these PSNR measures.

BRIEF SUMMARY OF THE INVENTION

Accordingly the present invention provides a method of measuring peak signal to noise ratio (PSNR) of full color video, both total and component contributions as well as providing PSNR full color and component maps. The components of the full color video for both reference and impaired video signals are converted to RGB values, and the error energy for each of the G, B and R channels between the reference and impaired is computed. Each component contribution to the error for the full color video components is assessed by setting the other components to a reference value, such as zero. Also the total full color PSNR is computed in RGB. Finally a color residual PSNR map is generated and displayed together with the computed PSNR results to enable a user to visualize where the significant impairments occur in the impaired video.

The objects, advantages and other novel features of the present invention are apparent from the following detailed description when read in conjunction with the appended claims and attached drawing.

DETAILED DESCRIPTION OF THE INVENTION

Figure 1:
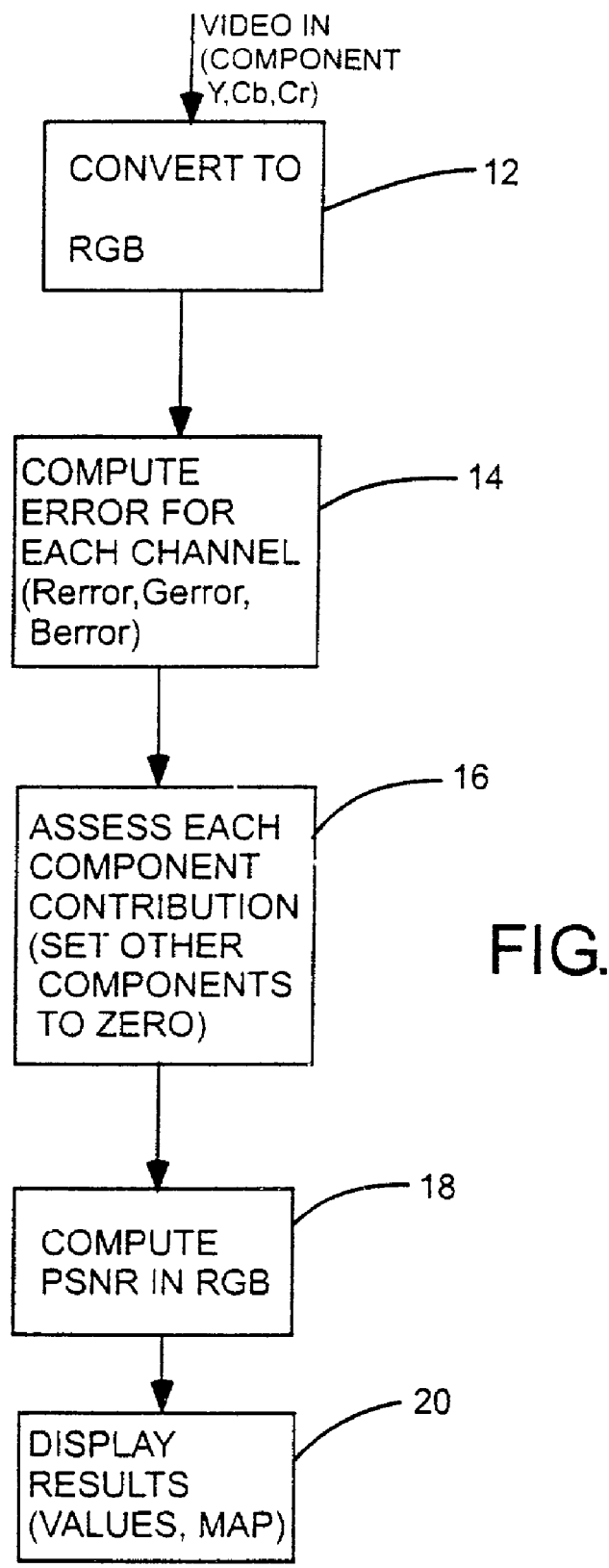
FIG. 1 is a flow chart view of the process for measuring peak signal to noise ratio of full color video according to the present invention.

Referring now to FIG. 1 in order to include chrominance, the $C_b$ and $C_r$ channels for example, in the PSNR calculation a method is formulated as detailed below that converts $YC_bC_r$ to RGB in step 12 and computes PSNR in RGB in step 18. The contributions of each channel may be assessed in step 16, i.e., $C_b$ PSNR may be measured simply by replacing the other channel test values with reference values, such as zero.

The conversion between $YC_bC_r$ and RGB in step 12, i.e., color matrix operations to transcode 422, Y, $C_r$, $C_b$ to/from RGB, 700 my sources, is as follows:

For the 422 input define reconstructed 422 source input matrix (from CCIR Recommendation 601-1) as $$[Y, C_b, C_r] := M422*[G, B, R]$$

where M422 := [0.587 0.114 0.299; −0.331 0.500 −0.169; −0.419 −0.081 0.500]. Therefore to convert Y, $C_b$, $C_r$ 422 signals to RGB, multiply by the inverse $$[G, B, R] := M422^{-1}*[Y, C_b, C_r]$$

where $M422^{-1} := [1\ -0.344\ -0.714;\ 1\ 1.772\ 9.902\times10^{-4};\ 1\ -9.267\times10^{-4}\ 1/402] := Mycbcr2rgb$.

The luminance PSNR definition in RGB is:

$$Y(R,G,B) := M422_{0,0}*G + M422_{0,1}*B + M422_{0,2}*R$$

or $$Y(R,G,B) := 0.587*G + 0.114*B + 0.299*R$$

and for the case where $C_b$ and $C_r$ differences are neglected (treated as zero)

$$R(Y) := Mycbcr2rgb_{2,0}*Y \quad G(Y) := Mycbcr2rgb_{0,0}*Y \quad B(Y) := Mycbcr2rgb_{1,0}*Y$$

$$R(Y) := Y \quad\quad\quad G(Y) := Y \quad\quad\quad B(Y) := Y$$

and the LumPSNR measurement is rewritten as:

$$LumPSNR(Y_{peak}, Y_{in}, Y_{out}, N_{col}, N_{row}, i, j, t, d) :=$$

$$20*\log\left[SQRT(peak(R(Y_{peak})) + peak(G(Y_{peak})) + peak(R(Y_{peak})))/\right.$$

$$SQRT((1/N_{col}*N_{row}))\sum_j\sum_i \left((R(Yin_{i,j,t-d}) - R(Yout_{i,j,t}))^2 + \right.$$

$$\left.\left.(G(Yin_{i,j,t-d}) - G(Yout_{i,j,t}))^2 + (B(Yin^{i,j,t-d}) - B(Yout_{i,j,t}))^2\right)\right]$$

Checking by substituting the R(Y), B(Y), G(Y) with Y, Y, Y using the definitions above:

$$LumPSNR(Y_{peak}, Y_{in}, Y_{out}, N_{col}, N_{row}, i, j, t, d) := 20*\log[SQRT(3)*Y_{peak}/\{SQRT((3/(N_{col}*N_{row}))*$$

$$\sum_j\sum_i (Yin_{i,j,t-d} - Yout_{i,j,t})^2)\}$$

$$:= 20*\log[Y_{peak}/\{SQRT((1/(N_{col}*N_{row}))*$$

$$\sum_j\sum_i (Yin_{i,j,t-d} - Yout_{i,j,t})^2)\}$$

Now simply by not suppressing $C_b$ and $C_r$ to zero—including actual values—in the definition in R, G, B, a "full color" PSNR becomes:

$R(Y,C_b,C_r):=Mycbcr2rgb_{2,0}*Y+Mycbcr2rgb_{2,1}*C_b+Mycbcr2rgb_{2,2}*C_r$ $G(Y,C_b,C_r):=Mycbcr2rgb_{0,0}*Y+Mycbcr2rgb_{0,1}*C_b+Mycbcr2rgb_{0,2}*C_r$ $B(Y,C_b,C_r):=Mycbcr2rgb_{1,0}*Y+Mycbcr2rgb_{1,1}*C_b+Mycbcr2rgb_{1,2}*C_r$ As shown in step 14 the error for each channel is computed as:

$RerrEngy:=\Sigma_j\Sigma_i(R(Yin_{i,j,t-d},Cbin_{i,j,t-d},Crin_{i,j,t-d})-R(Yout_{i,j,t},Cbin_{i,j,t},Crin_{i,j,t}))^2$ $GerrEngy:=\Sigma_j\Sigma_i(G(Yin_{i,j,t-d},Cbin_{i,j,t-d},Crin_{i,j,t-d})-G(Yout_{i,j,t},Cbin_{i,j,t},Crin_{i,j,t}))^2$ $BerrEngy:=\Sigma_j\Sigma_i(B(Yin_{i,j,t-d},Cbin_{i,j,t-d},Crin_{i,j,t-d})-B(Yout_{i,j,t},Cbin_{i,j,t},Crin_{i,j,t}))^2$ $ColorPSNR(Y_{peak},RerrEngy,GerrEngy,BerrEngy,N_{col},N_{row}):=20*\log[(SQRT(3)*Y_{peak})/SQRT((1/(N_{col}*N_{row}))*(RerrEngy+GerrEngy+bErrEngy))]$ As an example of "full color" PSNR, for convenience treat input and output video data as a simple set of three channels of one dimensional arrays:

$N:=100\ n:=0\ldots N-1\ Y_{peak}:=255$

Generate Y Channels, In & Out:

$Yin_n:=\text{floor}(rnd(1)*Y_{peak})$

Let ErrorLevel:=0.1

$Yout_n:=Yin_n+\text{floor}[(rnd(ErrorLevel)-0.5*ErrorLevel)*Y_{peak}]$ mean($Y_{in}$)=129.57 mean($Y_{out}$)=127.43

Generate $C_b$ Channels, In & Out:

$Cbin_n:=\text{floor}(rnd(1)*Y_{peak})$

Let ErrorLevel:=0.1

$Cbout_n:=Cbin_n+0*\text{floor}[(rnd(ErrorLevel)-0.5*ErrorLevel)*Y_{peak}]$ mean($C_{bin}$)=126.41 mean($C_{bout}$)=126.41

Generate $C_r$ Channels, In & Out:

$Crin_n:=\text{floor}(rnd(1)*Y_{peak})$

Let ErrorLevel:=0.1

$Crout_n:=Crin_n+0*\text{floor}[(rnd(ErrorLevel)-0.5*ErrorLevel)*Y_{peak}]$ mean($C_{rin}$)=139.24 mean($C_{rout}$)=139.24

PSNR, Luminance Only:

$LumPSNR:=20*\log[Y_{peak}/SQRT((1/N)\Sigma_n(Yin_n-Yout_n)^2)]$

LumPSNR=31.082 dB

"Full Color" PSNR With No Chrominance Errors:

$RerrEngy:=\Sigma_n[(R(Yout_n,Cbout_n,Crout_n)-R((Yin_n,Cbin_n,Crin_n))^2]$ $GerrEngy:=\Sigma_n[(G(Yout_n,Cbout_n,Crout_n)-G((Yin_n,Cbin_n,Crin_n))^2]$ $BerrEngy:=\Sigma_n[(B(Yout_n,Cbout_n,Crout_n)-B((Yin_n,Cbin_n,Crin_n))^2]$ $FullColorPSNR:=20*\log\{(SQRT(3)*Y_{peak})/(SQRT(1/N)*(RerrEngy+GerrEngy+BerrEngy))\}$ FullColorPSNR=31.082 dB LumPSNR=31.082 dB "Full Color" PSNR With Chrominance and Luminance Errors:

$Cbout_n:=Cbin_n+0.5*\text{floor}[(rnd(ErrorLevel)-0.5*ErrorLevel)*Y_{peak}]$ mean($C_{bin}$)=113.44 mean($C_{bout}$)=113.33

$Crout_n:=Crin_n+0.5*\text{floor}[(rnd(ErrorLevel)-0.5*ErrorLevel)*Y_{peak}]$ mean($C_{rin}$)=139.24 mean($C_{rout}$)=138.405

FullColorPSNR=29.262 dB LumPSNR=31.082 dB

"Full Color" PSNR With Only Chrominance Errors:

$Y_{out} := Y_{in}$

LumPSNR=∞dB $Cbout_n := Cbin_n + 0.5*\text{floor}[(rnd(\text{ErrorLevel})-0.5*\text{ErrorLevel})*Y_{peak}]$ mean($C_{bin}$)=113.44 mean($C_{bout}$)=113.125

$Crout_n := Crin_n + 0.5*\text{floor}[(rnd(\text{ErrorLevel})-0.5*\text{ErrorLevel})*Y_{peak}]$ mean($C_{rin}$)=139.24 mean($C_{rout}$)=139.425

FullColorPSNR=33.951 dB

"Full Color" PSNR Maximum:

$Yin_n := Y_{peak} \qquad Yout_n := 0$ $Cbin_n := Y_{peak}*.5 \quad Cbout_n := -Y_{peak}*.5$ $Crin_n := Y_{peak}*.5 \quad Crout_n := -Y_{peak}*.5$ LumPSNR=0 dB $Cbout_n := Cbin_n + 0.5*\text{floor}[(rnd(\text{ErrorLevel})-0.5*\text{ErrorLevel})*Y_{peak}]$ mean($C_{bin}$)=127.5 mean($C_{bout}$)=127.925

$Crout_n := Crin_n + 0.5*\text{floor}[(rnd(\text{ErrorLevel})-0.5*\text{ErrorLevel})*Y_{peak}]$ mean($C_{rin}$)=139.24 mean($C_{rout}$)=139.015

FullColorPSNR=0.003 dB

"Full Color" PSNR Maximum Sensitivity to $C_b$:

$Yin_n := Y_{peak} \qquad Yout_n := 0$ $Cbin_n := Y_{peak}*.5 \quad Cbout_n := -Y_{peak}*.5$ $Crin_n := Y_{peak}*.5 \quad Crout_n := -Y_{peak}*.5$ $\Sigma_i(RGB1_i - RGB2_i)^2 = 3$ $RpeakDueToCb := (RGB2_0 - RGB1_0)^2 = 1$ $GpeakDueToCb := (RGB2_1 - RGB1_1)^2 = 1$ $BpeakDueToCb := (RGB2_2 - RGB1_2)^2 = 1$ $YpeakFactorDueToCb := \text{SQRT}(3)$ Likewise the "Full Color" PSNR Maximum Sensitivity to $C_r$ is the same, i.e., $YpeakFactorDueToCr := \text{SQRT}(3)$ Using the above "Full Color" PSNR definition with the proper linear transform, each component of any color space representation may be used to make channel specific PSNR measurements. For example PSNR, $C_b$ only, $C_r$ only, and $C_b$ and $C_r$ (chroma) only PSNR measurements may be made as with luminance only. Likewise in RGB space any combination of R, G and B may be used. And finally any component representation, regardless of color space, may be used for analogous measures. The following are examples of weighting components of "full color" PSNR:

Generate Y Channels, In & Out:

$Yin_n := \text{floor}(rnd(1)*Y_{peak})$

Let ErrorLevel:=0.04

$Yout_n := Yin_n + \text{floor}[(rnd(\text{ErrorLevel})-0.5*\text{ErrorLevel})*Y_{peak}]$ mean($Y_{in}$)=129.02 mean($Y_{out}$)=128.06

Generate $C_b$ Channels, In & Out:

$Cbin_n := \text{floor}(rnd(1)*Y_{peak})$

Let ErrorLevel:=0.03

$Cbout_n := Cbin_n + 0.5*\text{floor}[(rnd(\text{ErrorLevel})-0.5*\text{ErrorLevel})*Y_{peak}]$ mean($C_{bin}$)=123.84 mean($C_{bout}$)=123.54

Generate $C_r$ Channels, In & Out:

$Crin_n := \text{floor}(rnd(1)*Y_{peak})$

Let ErrorLevel:=0.03

$Crout_n := Crin_n + 0.5*\text{floor}[(rnd(\text{ErrorLevel})-0.5*\text{ErrorLevel})*Y_{peak}]$ mean($C_{rin}$)=134.48 mean($C_{rout}$)=134.005

Assess each component contribution in step 16 to produce PSNR, Luminance Only:

LumPSNR=38.627 dB

"Full Color" PSNR With Chrominance & Luminance Errors:

FullColorPSNR=37.304 dB

"$C_b$" PSNR With Chrominance & Luminance Errors:

$C_b$PSNR=46.751 dB

"$C_r$" PSNR With Chrominance & Luminance Errors:

$C_r$PSNR=47.92 dB

Check Of Component PSNR Vs. "Full Color":

$CompositePSNR := 20*\log\{Y_{peak}/(\text{SQRT}((Y_{peak})^2/10^{(CbPSNR/10)}) + ((Y_{peak})^2/(10^{(CrPSNR/10)}) + (Y_{peak})^2/(10^{(LumPSNR/10)})))\}$
$= 37.583 \text{ dB}$ $FullColorPSNR = 37.304 \text{ dB}$ The reason for the need to convert to RGB is illustrated by the following example that shows the non-equivalence of using the Y, $C_b$, $C_r$ components directly to compute the FullColorPSNR, $C_b$PSNR and $C_r$PSNR. It is assumed that RGB should be the reference due to the fact that RGB is always a more direct representation of an image in any system that uses light sensors and displays based on RGB.

$YerrEngy := \Sigma_n[(Yout_n - Yin_n)^2]$ $CberrEngy := \Sigma_n[(Cbout_n - Cbin_n)^2]$ $CrerrEngy := \Sigma_n[(Crout_n - Crin_n)^2]$ $$ColorPSNR_{direct}(YerrEngy, CberrEngy, CrerrEngy, N, Y_{peak}) := 20 * \log[(SQRT(3) * Y_{peak}) / SQRT((1/(N)) *$$

$$(YerrEngy + CberrEngy + CrerrEngy))]$$

$$:= FullColorDirectPSNR$$

$$= 42.311 \text{ dB}$$

Compare with FullColorPSNR=37.304 dB.

Likewise when YerrEngy:=CrerrEngy:=0

CbDirectPSNR:=ColorPSNRdirect=51.881 dB

Compare with $C_b$PSNR=46.751.

In each case there is a difference of approximately 5 dB between the direct and RGB based measurements. Therefore the Y, $C_b$, $C_r$ values are converted to RGB as indicated above.

requirements: 1) $C_b$ and $C_r$ differences need to be added to a pedestal, i.e., 128 for 8-bit CCIR-601 video signals, instead of using the absolute value; and 2) in the event the luminance difference is near zero, chrominance differences will not be visible in the map, so that sufficient luminance must be added to make the chrominance visible—the amount added is to some extent proportional to the chrominance difference magnitude.

```
void colorDiffMap(BYTE*ref YCbCr, BYTE*imp YCbCr, BYTE*res YCbCr, long size)
{
    long Y,Cb,Cr,C;
    long minC = 16;
    long maxC = 240;
    while((size--) > 0)
    {
        Y = (long)*imp YCbCr++ - (long)*refYCbCr++;
        Cb = (long)*imp YCbCr++ - (long)*refYCbCr++;
        Cr = (long)*imp YCbCr++ - (long)*refYCbCr++;
        if(Y < 0) Y = -Y
        if(Y < 60)
        {                        "ADD LUMINANCE TO LOW LUMINANCE
                                  LEVELS"
            Y += 20;
            if(Cb² > Cr²) C = Cb
            else C = Cr;
            if(C < 0) C = -C;
            if(C > 10) Y += 50+(C>>1);
            if(Y > 235) Y = 235;
            if(C > 40 && Y > 100)
            {
                Y -= C;
                if(Y < 40) Y = 40;
            }
        }
        Cb += 128                         "ADD PEDESTAL"
        if (Cb < minC) Cb = minC;
        else if (Cb > maxC) Cb = maxC;
        Cr += 128;                        "ADD PEDESTAL"
        if(Cr < minC) Cr = minC;
        else if(Cr > MaxC) Cr = maxC;
        *res YCbCr++ = (BYTE)Y;           "GENERATE RESIDUAL MAP"
        *res YCbCr++ = (BYTE)Cb;
        *res YCbCr++ = (BYTE)Cr; }
}
```

Figure 2:
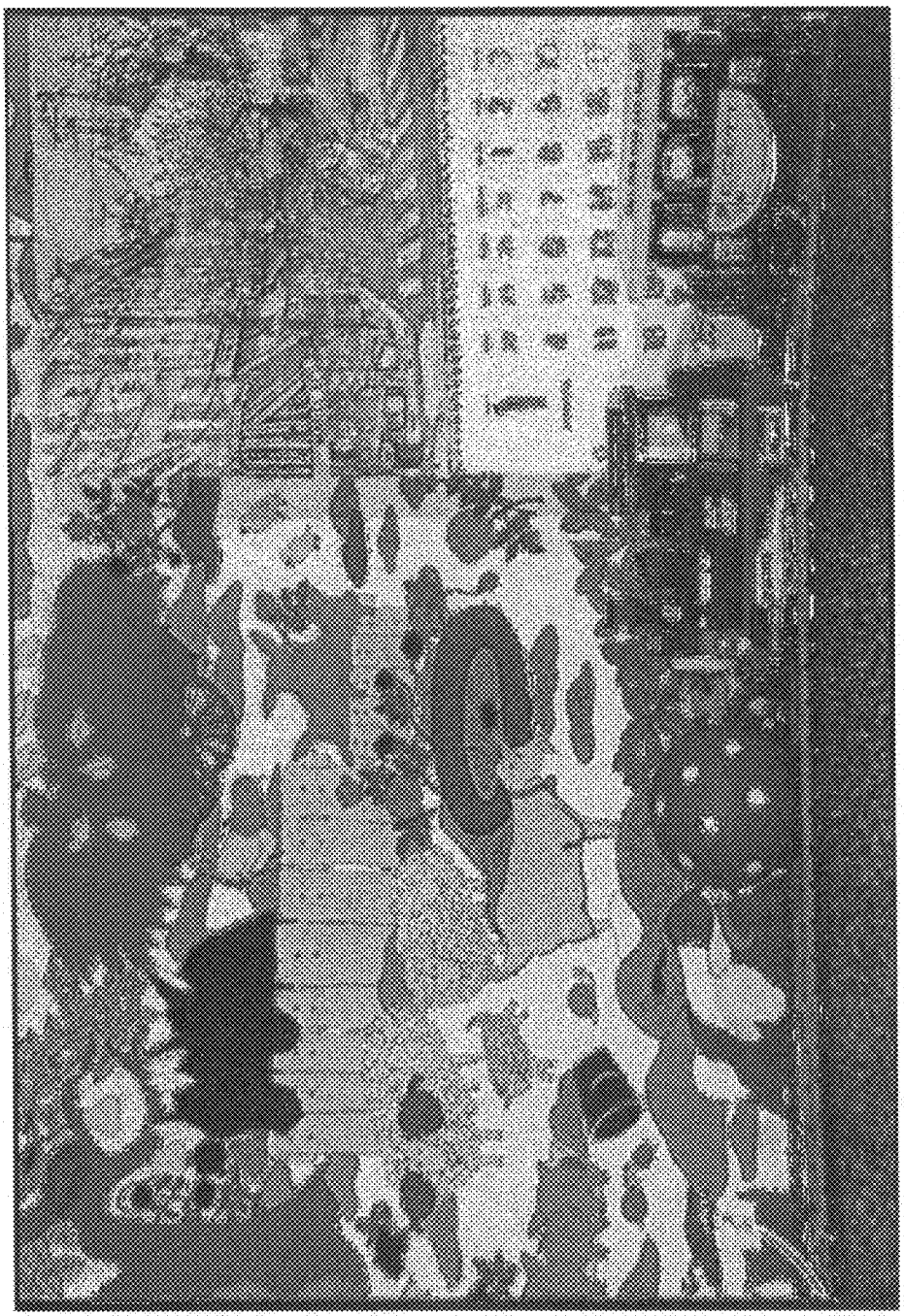
FIG. 2 is a color image view of a reference full color video.
Figure 3:
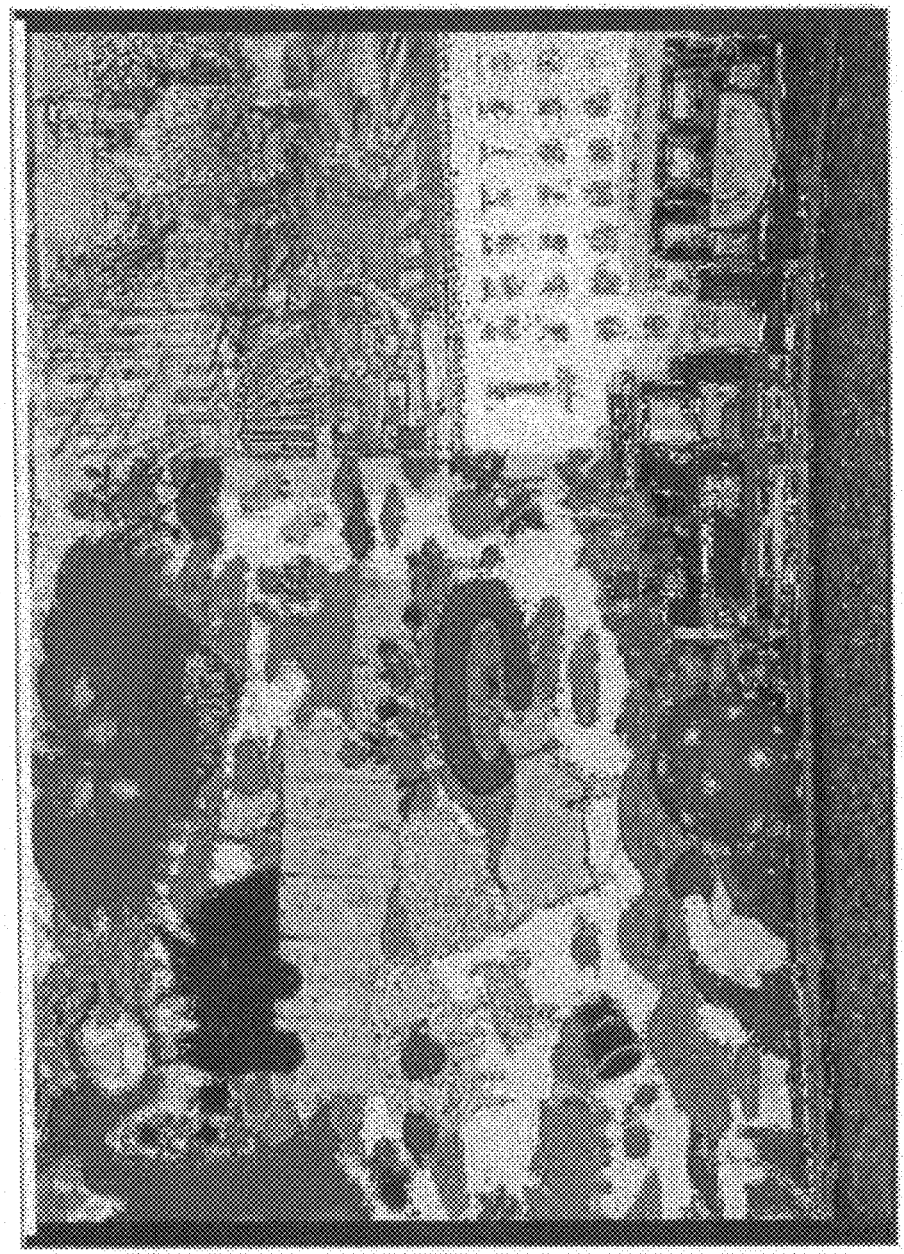
FIG. 3 is a color image view of an impaired full color video corresponding to the reference full color video.
Figure 4:
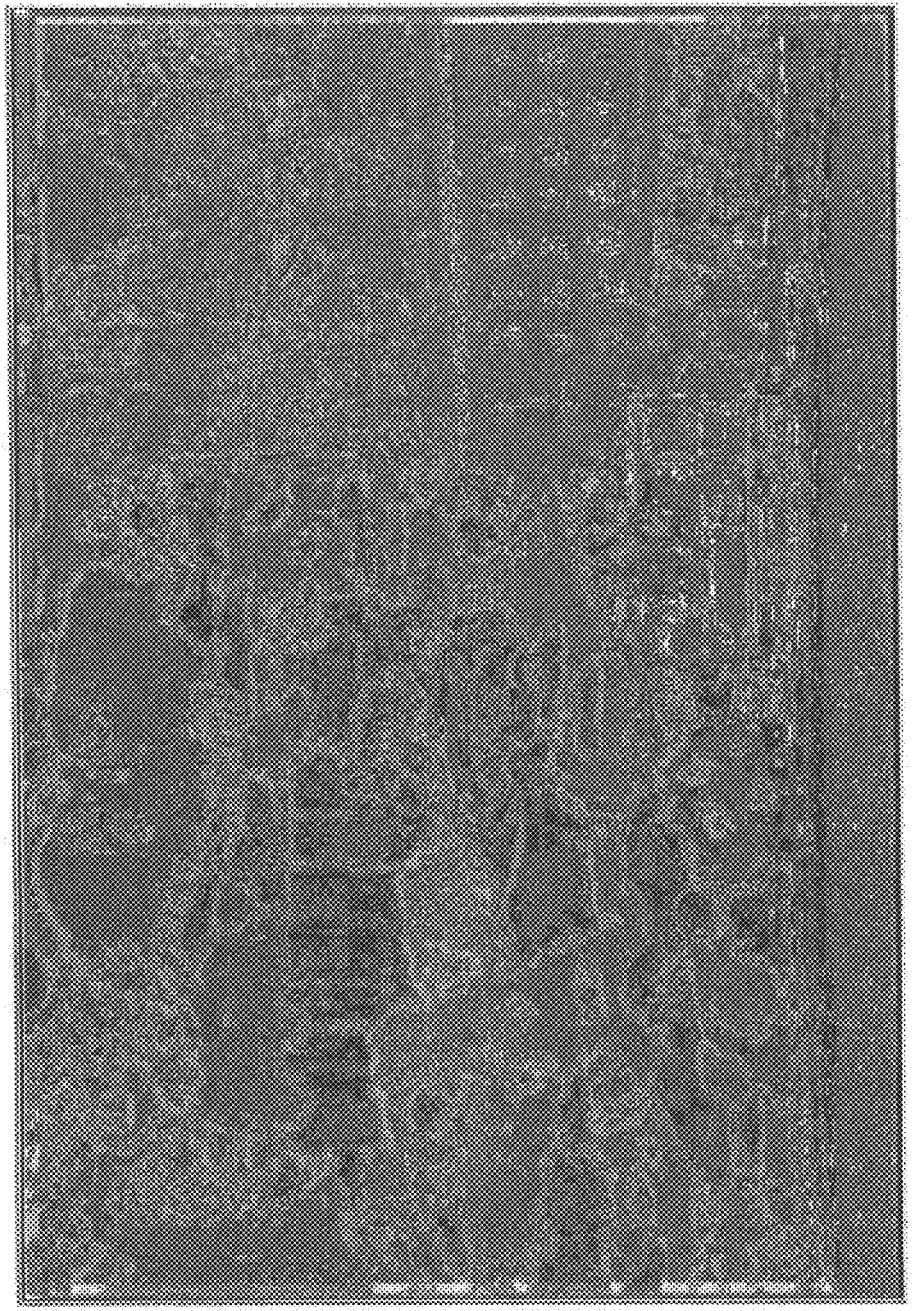
FIG. 4 is a color image view of a residual color PSNR map according to the present invention.

Likewise the method for luminance only maps involves for each pixel in each video frame of the video signal calculating the absolute difference between the reference and test luminance (Y) values. These absolute difference values are displayed as an image in step 20 which then conveys a one-to-one mapping of the test and reference luminance difference at each pixel location. For adding color difference information the difference in $C_b$ and $C_r$ is similarly calculated. However to display the difference in color, there are two additional FIGS. 2, 3 and 4 show respectively a reference color image, a corresponding impaired color image and a color PSNR or residual color map. The reference color image is a typical image used for MPEG compression video testing and has a complex background with a moving object, in this case a train rolling a ball along a track. Comparing FIGS. 2 and 3 there are some readily apparent impairments—see the horses' eyes, the goat, the foreground green bushes, the fence, etc. The resulting color PSNR map shows these impairments in color, with the locations of the most serious impairments being readily ascertainable.

Thus the present invention provides a method of measuring peak signal to noise ratio (PNR) of full color video signals, both total and component, by converting component video to RGB, computing error values for each RGB channel, obtaining the contributions of each component by replacing the other component test values with reference values, computing the total PSNR in RGB, and then displaying the results with a corresponding residual color PSNR map.

What is claimed is:

1. A picture quality analyzer having a display according to the method of displaying a color error map between a reference full color video signal and an impaired full color video signal produced by a picture quality analyzer comprising the steps of:
    calculating a difference value between an impaired value and a reference value for each pixel of a frame of each full color video having a luminance component and chrominance components obtained from the reference full color video signal and the impaired full color video signal, for each chrominance component adding the difference values to a pedestal;
    adding sufficient luminance as a function of the chrominance difference values to make the chrominance components visible in the color error map; and
    displaying the color error map.

2. A picture quality analyzer having a display according to the method of measuring peak signal to noise ratio (PSNR) between reference and impaired full color video signals having a luminance component and chrominance components produced by a picture quality analyzer comprising the steps of:
    converting the reference and impaired full color video signals to RGB videos;
    measuring the PSNR between the RGB videos to obtain a full color PSNR value;
    computing an error for each component of the RGB video;
    assessing each component contribution to produce a PSNR value for each component; and
    generating a color error map between the reference and impaired full color videos for display;
    wherein the generating a color error map step comprises the steps of:
    obtaining difference values for each of the chrominance components of the full color videos;
    adding the difference values to a pedestal;
    adding sufficient luminance to make the chrominance components visible in the color error map; and
    displaying the color error map.

3. A picture quality analyzer having a display according to the method of measuring peak signal to noise ratio (PSNR) between reference and impaired full color video signals having a luminance component and chrominance components produced by a picture quality analyzer comprising the steps of:
    converting the reference and impaired full color video signals to RGB videos;
    measuring the PSNR between the RGB videos to obtain a full color PSNR value; and
    generating a color error map between the reference and impaired full color videos for display;
    wherein the generating a color error map step comprises the steps of:
    obtaining difference values for each of the chrominance components of the full color videos;
    adding the difference values to a pedestal;
    adding sufficient luminance to make the chrominance components visible in the color error map; and
    displaying the color error map.

* * * * *